United States Patent Office 3,149,040
Patented Sept. 15, 1964

3,149,040
THIN FILM COATING FOR TABLETS AND THE
LIKE AND METHOD OF COATING
Sampson F. Jeffries, Indianapolis, Ind., assignor to The Dow Chemical Company, Midland, Mich., a corporation of Delaware
No Drawing. Filed Apr. 9, 1962, Ser. No. 185,863
5 Claims. (Cl. 167—82)

This invention relates to tablets and other individual dosage forms which are characterized by a thin film coating of a water-permeable plastic composition, and to the method of coating such tablets and dosage forms. The invention also relates to an improved, thin, water-permeable tablet coating film, and to a liquid composition useful for laying down the aforementioned film.

Various film coatings have been employed heretofore, but each of the known coatings tends to leave something to be desired. As an example, thin film tablet coatings containing cellulose acetate phthalate have been taught broadly. However, the coating compositions specifically taught which contain cellulose acetate phthalate, in addition to polyoxyethylene glycols having a molecular weight of about 3000 to 7500, have suffered from the disadvantage that they cannot be satisfactorily used for the coating of certain drugs and drug mixtures. For example, it has been found that the said polyoxyethylene glycols cannot be used in the coating of salicylates and salicylate derivatives, such as aspirin, because of the formation of a gummy mass when applied thereto. Moreover, the tablet coatings obtained using the prior art compositions leave something to be desired in the way of smoothness and gloss, so that it is desirable to improve over the general appearance of tablets coated with those compositions.

It is, therefore, a principal object of the present invention to overcome some of the disadvantages of known film coatings and to produce a film coated tablet which exhibits a handsome finished appearance, an appearance enhanced by improved smoothness and gloss.

Another object of the invention is to provide an improved film coating composition for tablets and the like.

Another object of the invention is to provide an improved method of film coating tablets and the like.

These and other objects and advantages of the present invention will be more clearly understood on becoming familiar with the following discussion and the appended claims.

According to the present invention, there is now provided a tablet coating composition which is comprised of a portion of cellulose acetate phthalate and a portion of a polyoxyethylene derivative of polypropylene glycol, the nature of which is hereinafter more fully described. Several other ingredients may be added to the previously-named ingredients to enhance the properties of the film coating obtained from the present composition. Among the more important of these additional materials are plasticizing agents, opaquing agents and coloring agents.

The cellulose acetate phthalate used is the well-known carboxylic acid partial ester of cellulose acetate.

The polyoxyethylene derivative of polypropylene glycol used in the present composition is a polymer containing about 80 to 90 percent ethylene oxide in the molecule. The polypropylene glycol base unit on which the polyoxyethylene is engrafted at both ends has a molecular weight in the range of 1500 to 1800. Moreover, the propylene units are not mixed with ethylene units. These derivatives of polypropylene glycol are remarkable in being water-soluble, practically tasteless and in having a toxicity of very low order. Another unusual property of these polypropylene glycol derivatives is that they are solids although the usual nonionic surface active agent is a liquid, a paste or a soft wax. The derivatives are obtained by condensing ethylene oxide on a polyoxypropylene base. The simplified chemical structure is shown as follows: $HO(C_2H_4O)_a(C_3H_6O)_b(C_2H_4O)_cH$, wherein the letters $a$, $b$ and $c$ indicate a plurality of the unit enclosed by parentheses. $b$ here has apparent values in the general range of about 26 to 34. The derivatives of polypropylene glycol employed in the present invention are sold under the name Pluronic, more especially Pluronic F-68.

Suitable plasticizing agents include diethyl phthalate, castor oil, corn oil, sesame oil and propylene glycol, as well known in the art. A particularly suitable plasticizing agent is a combination of about 1 part of diethyl phthalate per 2 parts of castor oil.

Among the coloring agents which may be used in the practice of this invention are any of the non-toxic dyes, lakes and pigments which can be dissolved in or otherwise dispersed in the solvent employed in the coating composition, and which have been certified for use in the food, drug and cosmetic industries as D. and C., or F.D. and C. colorants. For example, it has been found that dyes of the type represented by red F.D. and C. #3, green F.D. and C. #2, yellow F.D. and C. #5, violet F.D. and C. #1, red D. and C. #35, orange D. and C. #17 and green D. and C. #6 are suitable for use as colorants in the coating composition. Among the pigments which are suitable are Mapico Yellow AN–1 (yellow hydrated iron oxide), Mapico Brown AN–18 (brown hydrated iron oxide), Mapico Red AN–3 (red iron oxide) and Raven #15 Black (carbon black).

Many lakes are found suitable in the practice of this invention. A lake is a dye which has been precipitated on an insoluble metal compound. To meet Food and Drug Administration requirements, it is necessary to deposit one of the acceptable dyes on a pharmaceutically acceptable carrier such as aluminum hydroxide. As an example, F.D. and C. Red #3 may be deposited on aluminum hydroxide.

When the foregoing composition is applied to tablets according to the process of the invention, it is possible to provide a suitable coating for a tablet or the like with the use of relatively few coats or applications of the coating material. A highly important advantage of this invention is that the coating composition can be very satisfactorily and successfully applied to tablet cores, i.e., uncoated tablets, too porous to be coated satisfactorily with prior art compositions. It is not necessary to add magnesium stearate to most tablet formulations to obtain a sufficiently smooth core, as has often been required using prior art coating compositions. The initial coats applied using the present composition effectively seal the pores of the uncoated tablet core and a smooth coating is readily obtained which does not show lumping or "orange peel" effect. As a consequence, a much thinner build-up of multiple coats suffices to give adequate coverage of the tablets. This results in important savings in time and materials. Hence, it is possible to completely coat a tablet in a matter of minutes with an average of from about six to eight coatings, though more coats may be used, if desired.

Even when the coating composition claimed herein is applied without coloring agent, a tablet of pleasing appearance is obtained having a colorless coating. An opaque coating may be obtained by the addition of a quantity of titanium dioxide to the composition, if desired, as by triturating or milling the requisite amount with the coating composition. Examples of other opaquing agents are: Calcium carbonate, precipitated, U.S.P., and kaolin, N.F.

The invention is most highly suitable, however, to the application of colored film coatings of the type described in which a small quantity of a suitable coloring agent, such as the dyes and pigments and lakes previously set forth, or a mixture thereof with an opaquing agent, is incorporated into the solution prior to application on the tablets. In this manner, a highly pleasing appearance is given to the tablets and the tablets may be regarded as "elegant" in the terms of the trade. The film of this invention very effectively coats the tablets so that no unpleasant taste can be perceived, but at the same time, distinctive markings punched into the tablet core will show through very clearly and be readily discernible on the surface.

In preparing the fluid or liquid coating composition of the present invention, the components of the coating are dissolved in a suitable, volatile, non-aqueous solvent therefor, such as alcohol, acetone, methyl ethyl ketone, ethyl acetate, methylene dichloride or benzene, or a mixture of any of the foregoing, such as 1:1 mixture of alcohol (ethanol) and acetone, or a mixture of any of the foregoing with another organic solvent which is capable of serving as a solvent for both the derivative of polypropylene glycol and for the cellulose acetate phthalate. It is more convenient to dissolve the cellulose acetate phthalate and the plasticizing materials in the solvent first before adding the derivative of polypropylene glycol. In the instance that a 1:1 mixture of alcohol and acetone are employed to take up the entire composition, the composition is first admixed with alcohol alone before the addition of the requisite amount of acetone, since the derivative of polypropylene glycol does not dissolve smoothly when placed directly into acetone.

Usually a solution containing a total of 15 to about 25 percent w./v. of cellulose acetate phthalate and the derivative of polypropylene glycol together is prepared, more preferably about an 18 to 22 percent w./v. solution. On a weight percent basis, these compositions typically contain about 5 to 12 percent by weight of the derivative of polypropylene glycol, 10 to 14 percent by weight of cellulose acetate phthalate, 4 to 8 percent by weight of a plasticizer and the balance being substantially the volatile, non-aqueous solvent. Generally, the proportion of solvent on a weight basis is 65 to 75 percent by weight.

In another manner of defining the composition, the composition contains about 0.83 to 2.8 parts of cellulose acetate phthalate and 0.3 to 1.6 parts of plasticizer per part of the derivative of polypropylene glycol dissolved in a volatile, non-aqueous solvent therefor. In a more preferred range of concentrations, the fluid coating composition contains 7 to 10 percent by weight of the derivative of polypropylene glycol, about 11 to 12 percent by weight of cellulose acetate phthalate, about 5 to 7 percent of plasticizer and from 65 to 75 percent by weight of solvent.

The concentrations of the water-soluble derivative of polypropylene glycol and cellulose acetate phthalate may be varied only over rather small ranges, since solutions appreciably more concentrated than those set forth above tend to be quite viscous, while substantially more dilute solutions are of greatly diminished value in building up a film coating on tablets at an appreciable rate.

In coating tablets and the like with the present composition, a moving bed of tablets or granules and the like is provided as by placing the tablets or granules in a coating pan. As the coating pan rotates, the tablets tumble and small portions of the fluid composition are poured or sprayed onto the moving bed. Generally, from about 10 to about 15 milliliters of fluid coating composition is applied per coat per pound of tablets. As the tablets rotate, the material is distributed evenly over the surface thereof and in a few minutes, the solvent will have evaporated, leaving a dry, hard, thin film. A stream of warm air is then directed on the moving bed of tablets for several minutes. In this manner, a single coat has been applied. Thereafter, a second and subsequent coats are applied in the same manner until a total of about six to eight coats have been applied. This may be accomplished is as short a time as about 20 minutes. A short additional drying time of 20–30 minutes after removing the tablets from the coating pan is desirable to facilitate completion of drying.

If desired, tablets may also be coated with the composition of the invention while the tablets are maintained in a fluidized bed, according to methods now understood in the art of coating tablets.

The finished, dry coating on the tablet contains from about 0.83 to 2.8 parts of cellulose acetate phthalate and 0.3 to 1.6 parts of plasticizer per part of the derivative of polypropylene glycol. More preferably, the coating consists of 35 to 40 percent of the derivative of polypropylene glycol, 40 to 44 percent of cellulose acetate phthalate and about 19 to 23 percent of plasticizer.

The thin film coat of the invention is not an enteric coating. It is a water-permeable coating, although it contains a high proportion of cellulose acetate phthalate. Disintegration times for tablets and other such dosage forms are substantially that of the dosage form per se without any coating. Thus, the present coating is seen to loosen from tablets coated therewith in times as short as 12–15 seconds even in a static test in tap water at 37° C.

In another embodiment of the present invention, the cellulose acetate phthalate employed is modified by the substitution of both glyceryl monostearate and a homopolymer of ethylene oxide, having a molecular weight of about 1000, for part of the amount of the derivative of polypropylene glycol. Thus, a 1:1 mixture of glyceryl monostearate and the said homopolymer of ethylene oxide may be substituted for up to 80 percent by weight of the derivative of polypropylene glycol in the formulations described hereinabove. The film coating provided by the foregoing embodiment may be employed when it is desired to have a slightly softer film coat. It is also of advantage when it is desired to provide a film coat which dissolves even more rapidly than the film coat provided by the main embodiment of the invention.

Colored compositions according to the invention may be prepared by admixing one or more of the acceptable coloring agents with the present coating solution. Suitable proportions of coloring agent and coating solution are illustrated in tabular form.

| Coloring Agent | | Volume of Coating Solution, ml. | Method of Mixing |
|---|---|---|---|
| Kind | Weight, mg. | | |
| F.D. & C. Green #2 | 50 | 100 | Stir to dissolve. |
| F.D. & C. Yellow #11 | 50 | 100 | Mill or stir vigorously. |
| Aluminum Lake of F.D. & C. Red #3. | 100 | 100 | Triturate or ball mill. |
| Mapico Red AN-3 (iron oxide). | 200 | 100 | Do. |
| Titanium Oxide | 1,000 | | |

The expressions "w./v." and "v./v." are used herein for their customary meaning as understood in the pharmaceutical industry. The expression "w./v." means weight per volume, i.e., the weight in grams of ingredient per 100 milliliters of suspension or solution. The expression "v./v." means volume of ingredient per unit volume of suspension or solution.

The following examples serve to illustrate the present invention but are not to be considered limiting thereof.

*Example 1*

A tablet coating solution is made up according to the following formula:

Pluronic F-68 surface active
  agent _____ 10 grams.
Cellulose acetate phthalate _ 12 grams.
Diethyl phthalate _____ 1.5 milliliters (approx. 1.65 grams).
Castor oil, U.S.P. _____ 5 milliliters (approx. 4.8 grams).
Acetone, U.S.P., alcohol,
  SDA-3A (equal parts) __ Q.s. 100 milliliters (approx. 70 grams of solvent).

The cellulose acetate phthalate, diethyl phthalate and castor oil are dissolved in the acetone-alcohol and then the Pluronic F-68 surface active agent is dissolved in the solution and the solution made up to 100 milliliters. The so-prepared coating solution is applied to a moving bed of tablets consisting of 4 pounds of tablets, weighing 0.5 gram each, in a small coating pan. As the tablets tumble in the pan, a small portion of coating solution (about 10-15 milliliters) is distributed evenly over the surface of the tablets. In a few minutes' time the solvents evaporate, leaving a dry, hard film. A stream of warm air is then directed on the moving bed of tablets for several minutes. Thereafter, a second coat is applied in the same manner and subsequent coats are similarly applied until a total of six coats have been applied over a period of about 20 minutes. A short additional drying time of 20-30 minutes after removal of the tablets from the coating pan assures completion of drying and removal of residual solvent odors.

Tablets coated in this manner are pleasing in appearance, the coating is smooth and exhibits a moderate degree of gloss. Disintegration tests carried out on the tablets show that the film coating thereon will disintegrate in as short a time as 15-20 seconds in water or artificial gastric juice.

*Example 2*

100 milliliters of tablet coating solution, prepared as in Example 1, is colored by dissolving therein 50 milligrams of F.D. & C. Green #2. The colored solution is applied to 3.5 pounds of 0.5 gram tablets in the same manner as described in Example 1, except that eight coats are applied.

The so-coated tablets exhibit a pleasing green color, the coating is smooth and the tablets exhibit a moderate gloss. The tablets are considered handsome, in the words of the trade. Disintegration tests carried out on the coated tablets show that the film coating thereon will disintegrate in as short a time as 15-20 seconds either in water or in artificial gastric juice.

*Example 3*

A tablet coating solution is made up according to the following formula:

Pluronic F-68 surface active agent _____grams__ 3
Glyceryl monosterate _____do____ 4.5
Polyethylene glycol 1000 _____do____ 4.5
Cellulose acetate phthalate _____do____ 12
Diethyl phthalate _____milliliters__ 1.5
Castor oil, U.S.P. _____do____ 5
Acetone, U.S.P., alcohol, SDA-3A (equal parts),
  q.s. _____milliliters__ 100

The cellulose acetate phthalate, diethyl phthalate and castor oil are first dissolved in a portion of acetone-alcohol solvent. The Pluronic F-68 surface active agent, glyceryl monostearate and polyethylene glycol 1000 are then dispersed in the solution and the solution is brought to 100 milliliters volume. The formulation is then colored by triturating 200 milligrams of Mapico Red AN-3 (iron oxide) and 1 gram of titanium oxide with the solution. Five pounds of tablets, weighing 0.6 gram each, are then coated in the same manner as the tablets in Example 1, except that the tablets receive seven coats.

Tablets coated in this manner are handsome in appearance, exhibit a pleasant, red color, the coating is smooth and the coating exhibits a moderate gloss.

The coating, coating solution and coating method of the invention having been described, various modifications thereof will be apparent to those skilled in the art and the scope of the invention is to be considered limited only by the scope of the hereafter appended claims.

I claim:

1. A fluid composition adapted for application to tablets and the like in the formation of a film coating thereon which consists essentially of from 0.83 to 2.8 parts of cellulose acetate phthalate and 0.3 to 1.6 parts of a plasticizer per part of a polyoxyethylene derivative of polypropylene glycol, said derivative containing about 80 to 90 percent of ethylene oxide in the molecule, and the propylene glycol base unit having a molecular weight in the range of 1500 to 1800, dissolved in a volatile, nonaqueous solvent therefor.

2. The composition as in claim 1 in which up to 80 percent by weight of the said derivative of polypropylene glycol is replaced with a 1:1 mixture of glyceryl monostearate and a polyethylene glycol having a molecular weight of about 1000.

3. A fluid composition adapted for application to tablets and the like in the formation of a film coating thereon which consists essentially of by weight from 7 to 10 percent of a polyoxyethylene derivative of polypropylene glycol, said derivative containing about 80 to 90 percent ethylene oxide in the molecule, and the propylene glycol base unit having a molecular weight in the range of 1500 to 1800, from about 11 to 12 percent of cellulose acetate phthalate, from about 5 to 7 percent of a plasticizer selected from the group consisting of diethyl phthalate, castor oil, sesame oil, propylene glycol, and a mixture consisting of one part of diethyl phthalate per 2 parts of castor oil and from about 65 to 75 percent of a volatile, nonaqueous solvent therefor selected from the group consisting of alcohol, acetone, methylethyl ketone, ethyl acetate, methylene dichloride, benzene and mixtures thereof.

4. A coated tablet having as the coating material a thin film consisting essentially of by weight 0.83 to 2.8 parts of cellulose acetate phthalate and 0.3 to 1.6 parts of a plasticizer per part of a polyoxyethylene derivative of polypropylene glycol, said derivative containing about 80 to 90 percent of ethylene oxide in the molecule, and the propylene glycol base unit having a molecular weight in the range of 1500 to 1800.

5. A coated tablet having as the coating material a thin film consisting essentially of by weight from about 35 to 40 percent of a polyoxyethylene derivative of polypropylene glycol, said derivative containing about 80 to 90 percent of ethylene oxide in the molecule, and the propylene glycol base unit having a molecular weight in the range of 1500 to 1800, 40 to 44 percent of cellulose acetate phthalate and about 19 to 23 percent of a plasticizer selected from the group consisting of diethyl phthalate, castor oil, sesame oil, propylene glycol and a mixture consisting of one part of diethyl phthalate per 2 parts of castor oil.

References Cited in the file of this patent

UNITED STATES PATENTS 2,881,085    Endicott et al. _____ Apr. 7, 1959
2,918,411    Hill _____ Dec. 22, 1959
2,957,804    Shuyler _____ Oct. 25, 1960

(Other references on following page)

UNITED STATES PATENTS 2,975,099 Goyan et al. ........... Mar. 14, 1961
3,030,273 Zagnoli ............... Apr. 17, 1962

FOREIGN PATENTS 762,229 Great Britain .......... Nov. 28, 1956
764,342 Great Britain .......... Dec. 28, 1956

OTHER REFERENCES

Chapman et al.: "Physiological Availability of Drugs in Tablets," Canadian Med. Assn. J., vol. 76, pp. 102–106, Jan. 15, 1957.

Dragstedt: "Oral Medication With Preparations for Prolonged Action," J.A.M.A., vol. 168, No. 12, pp. 1652–1655, Nov. 22, 1958.

Campbell et al.: "Oral Prolonged Action Medication," Practitioner, vol. 183, pp. 758–765, December 1959.

Lazarus et al.: "Oral Prolonged Action Medicaments: Their Pharmaceutical Control and Therapeutic Aspects," J. Pharm. and Pharmacol., vol. 11, No. 5, pp. 257–290 (pp. 266–271, 277–279, and 285–288 are especially pertinent to In Vivo Tablet Availability of Drugs), May 1959.

UNITED STATES PATENT OFFICE
CERTIFICATE OF CORRECTION

Patent No. 3,149,040                      September 15, 1964

Sampson F. Jeffries

It is hereby certified that error appears in the above numbered patent requiring correction and that the said Letters Patent should read as corrected below.

Column 8, after line 11, add the following reference

Gross et al. "Transformulation to Filmcoating", Drug and Cosmetic Industry, vol. 86, No. 2, pp. 170-171, 264, 288-291, Feb. 1960.

Signed and sealed this 22nd day of December 1964.

(SEAL)
Attest:

ERNEST W. SWIDER                    EDWARD J. BRENNER
Attesting Officer                       Commissioner of Patents